United States Patent [19]

Lockwood

[11] Patent Number: 4,941,380

[45] Date of Patent: Jul. 17, 1990

[54] MACHINES FOR CUTTING CARDBOARDS AND LIKE MATERIALS

[75] Inventor: Robin C. Lockwood, East Norton, England

[73] Assignee: Keencut Limited, Corby, England

[21] Appl. No.: 324,410

[22] Filed: Mar. 15, 1989

[30] Foreign Application Priority Data

Mar. 17, 1988 [GB] United Kingdom ............... 8806385

[51] Int. Cl.⁵ ............................................. B26D 3/02
[52] U.S. Cl. ....................................... 83/455; 83/454; 83/614; 83/635
[58] Field of Search .................. 83/455, 614, 745, 454, 83/388, 452, 460, 387, 581, 471.3, 455, 614, 635; 269/254 R, 91, 94

[56] References Cited

U.S. PATENT DOCUMENTS

| | | | |
|---|---|---|---|
| 1,978,787 | 10/1934 | Evanguelidi | 83/455 |
| 3,897,706 | 8/1975 | Martin | 83/455 |
| 4,022,095 | 5/1977 | Jones | 83/614 |
| 4,505,174 | 3/1985 | Carithers, Jr. | 83/614 |
| 4,570,516 | 2/1986 | Bruns | 83/614 |
| 4,798,112 | 1/1989 | Kozyrski | 83/614 |

FOREIGN PATENT DOCUMENTS 1479645 11/1974 United Kingdom .

Primary Examiner—Hien H. Phan
Assistant Examiner—Hwei-Siu Payer
Attorney, Agent, or Firm—Darby & Darby

[57] ABSTRACT

A machine for cutting cardboards or the like has a base board, a clamp bar extending across it and spaced mounting arms for the clamp bar. A cutter head is slidingly mounted on the clamp bar. A projecting wedge member on the cutter head is slidingly received in a complementary wedge shaped slot in the clamp bar. The clamp bar is connected to the spaced arms by resilient connecting means permitting limited angular movement of the bar relative to the arms, while taking up lost motion in the connection.

10 Claims, 3 Drawing Sheets

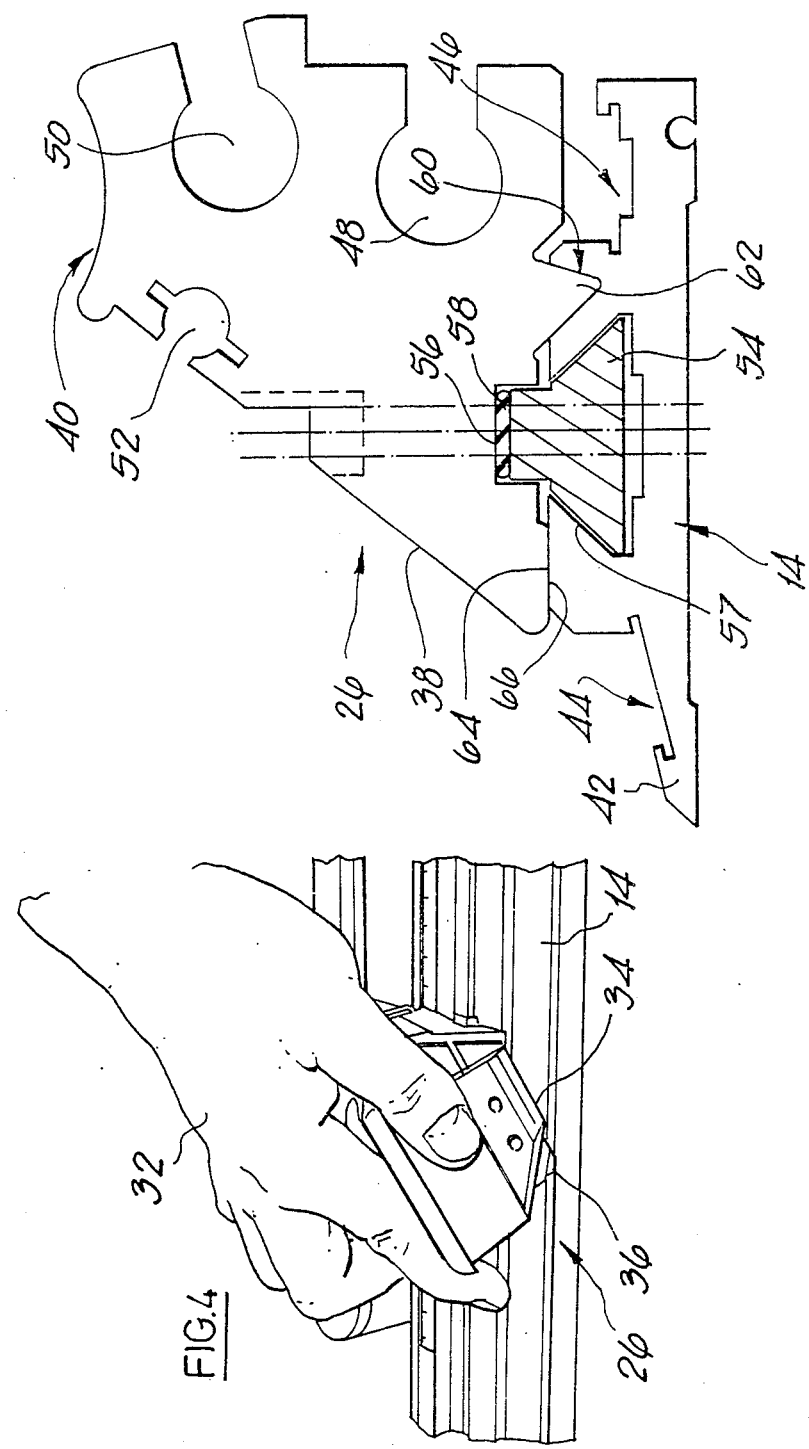

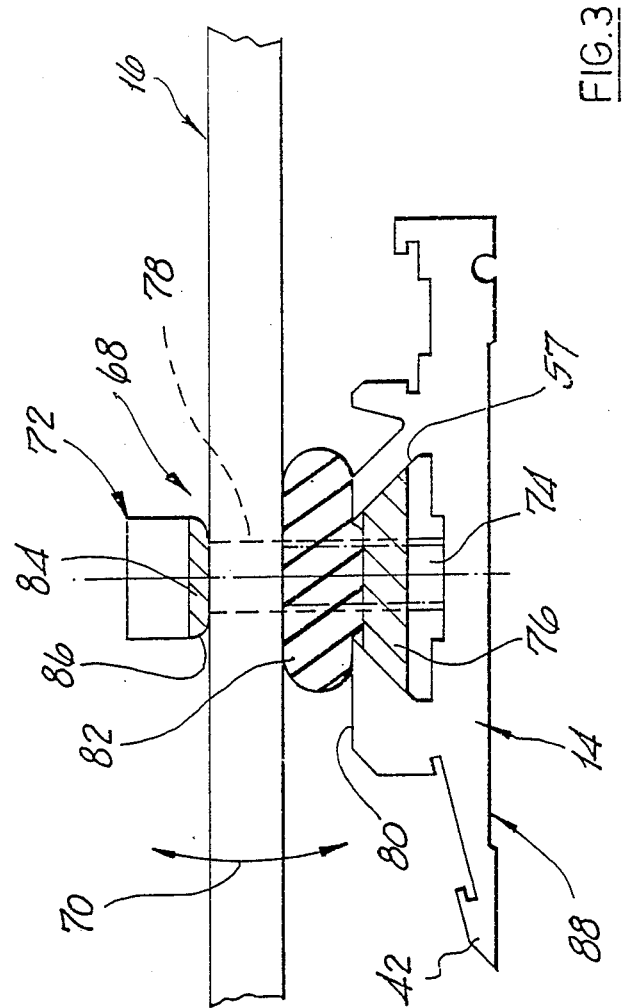

MACHINES FOR CUTTING CARDBOARDS AND LIKE MATERIALS

TECHNICAL FIELD

This invention relates to machines for cutting and like materials as used, for example, by picture framers, designers, artists, photographers and the like. Among the uses of such machines are the reduction of large sheets of card or board to smaller sizes, and the cutting of apertures therein, whether with bevelled or square-cut edges. Machines of this kind will be referred to herein, and in the claims, as cutting machines of the kind set forth. It is to be understood that this definition is not limited to the provision of bevel cutting or other features which might be needed for particular applications falling within the uses mentioned above.

Machines of the kind set forth may include a base board to support cardboards and the like to be cut, together with a clamp bar extending across the base board, to clamp the materials to be cut. A cutter head may be mounted on the clamp bar for lengthwise sliding movement with respect thereto, to cut the materials.

BACKGROUND OF THE INVENTION

Various proposals have been made with respect to the arrangements for providing lengthwise sliding movement of the cutter head, including various forms of guidance. However, these prior proposals suffer from various shortcomings including a lack of lateral stability for the cutter head, undue free movement of the cutter head in use, leading to inaccurate cutting, imperfect alignment of the cutter head with respect to the clamp bar, and difficulties of adjustment of the cutter head with respect to the clamp bar so as to achieve a satisfactory compromise between free running and adequate guidance.

It will be understood that in cutting machines of the kind concerned, considerable downward loading on the cutter head is exerted by the user, and thus the machine must provide adequate support to accommodate this loading. Likewise, the cutter head must be freely slidable so that cutting is effected with an easy sliding action. Moreover, it will also be readily apparent that any slop or slack in the system will lead to inaccurate cutting, which could lead to visually unsatisfactory products.

In short, previous proposals in this regard have provided an unsatisfactory compromise between guidance, support and avoidance of lost motion in the system, and it is an objection of the present invention to provide improvements in one or more of the respects discussed above, or generally.

A further aspect of the invention relates to the mounting of the clamp bar.

Previous proposals in this regard provide a pair of spaced arms between which the clamp bar is connected, and means is provided for raising and lowering the clamp bar to permit insertion of matter to be cut.

However, previous proposals have generally provided a fabricated system using conventional mounting and connection techniques between the base board, the spaced arms and the clamp bar. The shortcoming of this previous arrangement has become evident when machines of this sort have been used, in recent times, for cutting thicker and thicker materials. In short, the clamp bar is unable satisfactorily to accommodate these thicker materials, and does not sit squarely and easily thereon during use. This leads to difficulties for the user, and unsatisfactory results, and it is an object of the present invention to provide a cutting machine of the kind set forth offering improvements in relation to one or more of these respects, or generally.

SUMMARY OF THE INVENTION

According to the invention there is provided a cutting machine of the kind set forth comprising a base board to support cardboards or the like to be cut. A clamp bar extends across the base board to clamp materials to be cut. A cutter head is mounted on the clamp bar for lengthwise sliding movement with respect thereto to cut said materials. Cooperating guide means on the clamp bar and the cutter head are provided, comprising a lengthwis-extending guide way on the clamp bar and a guide member on the cutter head. The guide way and the guide member have complementary tapering profiles. The cutting machine is characterised by the feature that the guide way and the guide member comprise a projecting wedge member and a complementary wedge-shaped slot to receive the wedge member.

According to a second aspect of the invention, a cutting machine of the kind set forth comprises a base board to support cardboards or the like to be cut. A clamp bar extends across the base board to clamp materials to be cut. Mounting means for the clamp bar comprises a pair of spaced arms between which said clamp bar is connected. Means is provided for raising and lowering the clamp bar to permit insertion of material to be cut, said means permitting at least the ends of the spaced arms to be raised. A cutter head is mounted on the clamp bar for lengthwise movement with respect thereto, to cut the material. The cutting machine is characterised by the feature that the spaced arms are each connected to said clamp bar by connection means permitting limited angular movement of the arm relative to the bar. The connection means may comprise resilient means permitting the limited angular movement while taking up lost motion in the connection.

BRIEF DESCRIPTION OF THE DRAWINGS

FIG. 2 shows a cross-section through a clamp bar and co-operating cutter head seen in FIG. 1, the section being taken generally in the plane II—II in FIG. 1;

FIG. 3 shows a section, corresponding to that of FIG. 2, but taken at one end of the clamp bar, showing the connection of same to a support arm therefor; and FIG. 4 shows a perspective view of the cutter head of FIG. 1 during use.

Figure 1:
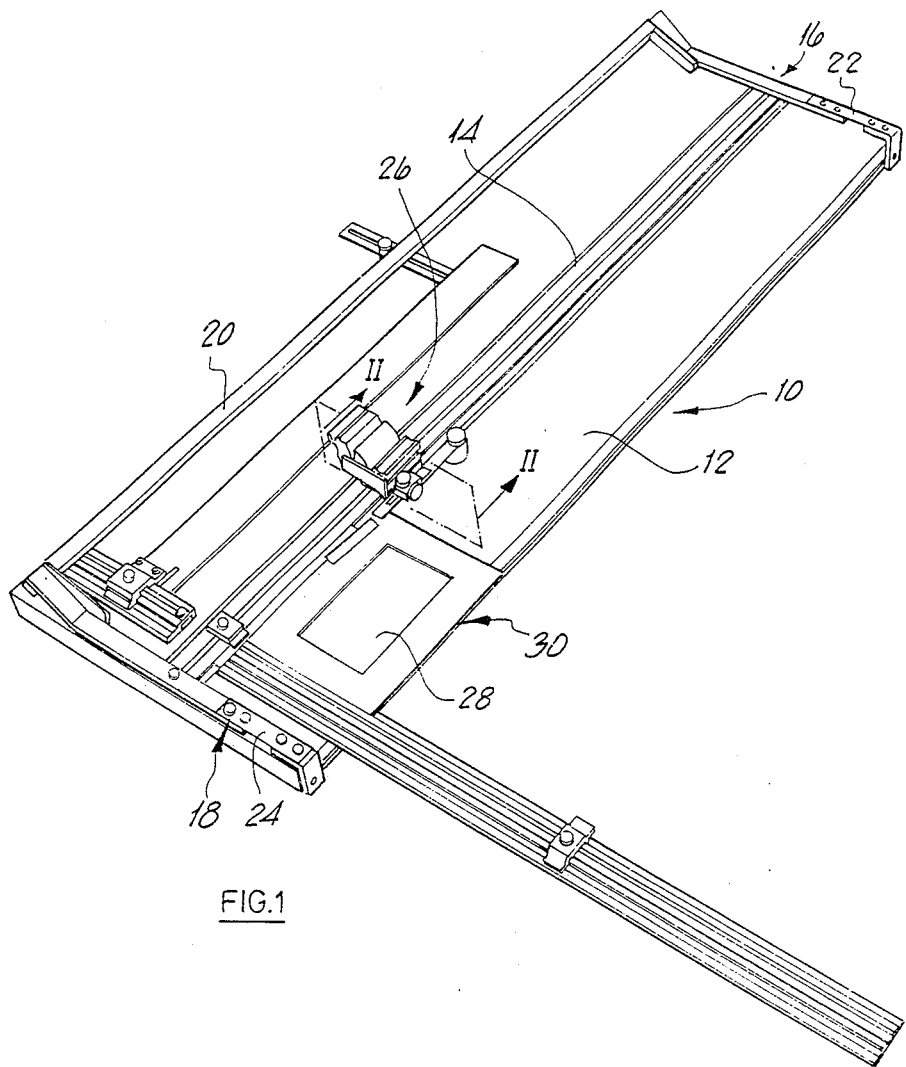
FIG. 1 shows a perspective view of a cutting machine of the kind forth.

As shown in the drawings, a machine 10 for cutting card, board and like materials as used by picture framers, designers, artists, photographers etc comprises a base board 12 to support the card, board and the like to be cut. A clamp bar 14 extends across the base board to clamp materials to be cut. Mounting means is provided for the clamp bar and comprises a pair of spaced arms 16, 18 to which the ends of the clamp bar are connected.

Means is provided for raising and lowering the clamp bar to permit insertion of materials to be cut. This means permits at least the ends of the arms 16, 18 to be raised, and comprises a torsion bar 20 interconnecting the ends of the arms 16, 18, for manual lifting by the user, and a pair of actuatable support legs, not seen in the drawings, whereby the torsion bar 20 can be held in a raised position for insertion of card under the clamp bar. The arms 16, 18 comprise leaf springs 22, 24 which permit the torsion bar 20 to be raised by simple bending of the springs. This provides a very durable and practical construction.

A cutter head 26 is mounted on clamp bar 14 for lengthwise sliding movement with respect thereto, to cut the card or other materials. Stop means, not shown in detail, is provided to enable a user accurately to cut card to size and to cut apertures, for example aperture 28 shown in card 30 during use.

FIG. 4 shows cutter head 26 in use, with the hand 32 of the user actuating, by means of thumb and index finger, a pivotable cutter element 34 having a blade 36. Pivotal movement of element 34 enables the user to bring blade 36 into and out of its cutting position.

Turning now to FIG. 2, it will be seen that clamp bar 14 is shown together with a sliding block 40 forming part of cutter head 26. Block 40 provides a mount for cutter element 34 carrying blade 36. Blade 36 engages the material to be cut by projecting slightly beyond the edge 42 of clamp bar 14. Blade 36 and cutter element 34 are not shown in FIG. 2. Clamp bar 14 is formed with recesses 44 and 46 to mount scales for measurement purposes during use. Profiled recesses 48, 50 and 52 in sliding block 40 provide mountings for further structures of the cutting machine not relevant for present purposes.

As shown in FIG. 2, cutter head 26 is located on clamp bar 14 by means of a sliding locater 54 mounted on block 40 by means of a fastener 56 and an intermediate spring element 58. Locater 54 is generally of upwardly tapering form and is captively slidably received in a corresponding channel 57 formed in clamp bar 14. Fastener 56 is adjusted so that the locater freely slides in channel 57.

In order to support cutter head 26 for free sliding movement lengthwise of clamp bar 14, there is provided cooperating guide means on the clamp bar and on the cutter head, the guide means comprising a lengthwise extending guideway on the clamp bar and a guide member on the cutter head, the guideway and the guide member having complementary tapering profiles. As shown in FIG. 2, guideway 60 is in the form of a wedge shaped slot formed in clamp bar 14, and guide member 62 is in the form of a projecting wedge member received in the slot. These cooperating guide elements provide exact sliding location of the cutter head 26 relative to the clamp bar. The more the user presses down on the cutter head, the more exactly is the location of the two established. The wedge profile of these elements ensures that no lost motion can exist.

In addition to the guideway 60 and guide member 62 there are also provided interengaging sliding support surfaces 64, 66 which are rigidly or stationarily disposed on cutter head 26 and clamp bar 14, respectively, and which serve also to resist downwardly directed loads in use.

Before use, the captively slidably received locater 54 is adjusted to provide easy sliding movement while adequately locating cutter head 26. After that, no further adjustment is needed and the cutter head freely slides in an accurately controlled manner and without lost motion. Surfaces 64, 66 and the engaging surfaces of the guideway and guide member 60 and 62 are provided with a low friction material such as UHMW Polyfine to promote free sliding movement.

Turning now to FIG. 3, it will be seen that this shows the connection of the clamp bar 14 to the arm 16 on which it is mounted.

As shown, clamp bar 14 is connected to arm 16 by connection means. 68 permitting limited angular movement of the arm 16 relative to the bar, as shown by arrow 70.

Connection between arm 16 and bar 14 is provided by a fixing bolt 72 having a threaded shank 74 on which is threadedly received a clamping nut 76 profiled to engage the inner surface of the locating channel 57. Rotation of bolt 72 relative to clamping nut 76 causes engagement of the lower end of the bolt with the base of the channel, whereby the bolt is rigidly fixed in its upstanding attitude.

Arm 16 is received on the shank of bolt 72 by means of a clearance aperture 78, and the substantial free movement between arm 16 and the upper surface 80 of clamp bar 14 is taken up by a rubber collar or bush 82 which is likewise received on the shank 74.

A bush 84 having a rounded profile 86 for engagement with the upper surface of arm 16 provides for rolling contact between the two.

In use, clamp bar 14 is raised by lifting torsion bar 20 and material to be cut is inserted below surface 88 of the clamp bar. By virtue of bending of leaf springs 22 and 24, the attitude of arm 16 relative to clamp bar 14 differs from that shown in FIG. 3. This change in attitude is accommodated by the rubber element 82 and angular movement of the arm 16 about the arc 70, whereby clamp bar 14 sits squarely on top of the material to be cut, and the assembly is in an unstressed condition, and cutting can proceed effectively.

Amongst other modifications which could be made in the above embodiment while remaining within the scope of the invention are the following. Firstly, the arrangement of guide member 62 and the guide slot 60 could be inverted, and their profiles could be modified somewhat. It will be noted that the profile is non-symmetrical. The more nearly one of the faces is to the vertical, the more the assembly resists riding out of the slot. The locating arrangement for the cutter head relative to the clamp bar could be modified. By providing an adjustable locating means, and only one guiding and supporting system, the need for critical adjustment is avoided. The sliding surfaces 64, 66 while taking downward loads do not interfer with precise location of the cutter head.

I claim:

1. A cutting machine, comprising:
   (a) a base board to support a workpiece such as a cupboard to be cut;
   (b) a clamp bar extending across the base board to clamp materials to be cut;
   (c) a cutter head adjustably captively slidably mounted on the clamp bar for lost motion inhibiting lengthwide sliding movement with respect thereto to cut said materials;
   (d) co-operating guide means on the clamp bar and the cutter head comprising a guideway on one of the clamp bar and the cutter head, and a guide member on the other one of the clamp bar and cutter head, said guideway being a recessed V-shaped slot having opposite sides and said guide member being a complementary outwardly tapering protrusion having opposite sides and correspondingly contoured to be slidingly received in said slot, said protrusion having sliding contact on both sides of said V-shape; and (e) additional interengaging sliding support surfaces rigidly disposed on said cutter head and said clamp bar, said additional surfaces being spaced from said guideway and guide member.

2. The machine of claim 1, wherein the corresponding opposite sides of said tapering protrusion and said slot are inclined at differing angles to the horizontal in the normal operating attitude of said machine.

3. The machine of claim 2, wherein one side of said tapering protrusion and said slot lies at an angle within the range of 35 degrees to 55 degrees to the horizontal, and the other side thereof lies at an angle within the range of 65 degrees to 85 degrees to the horizontal.

4. The machine of claim 1, wherein said tapering protrusion is provided on said cutter head.

5. The machine of claim 1, wherein said projecting tapered protrusion is provided on said cutter head.

6. A cutting machine comprising:
(a) a base board to support card, board or the like, to be cut;
(b) a clamp bar extending across the base board to clamp materials to be cut;
(c) mounting means for said clamp bar including a pair of spaced arms to which said clamp bar is connected by connection means permitting limited angular movement of said arm relative to said bar, said connection means comprising resilient means permitting said limited angular movement while taking up lost motion in the connection, said connection means further comprising a fastener, and means for rigidly securing the fastener to said clamp bar in an upstanding attitude, the respective one of said spaced arms being received on the shank of said fastener between said clamp bar and an abutment on said fastener, and said resilient means includes a resilient element inserted on said shank of said fastener between said abutment and said clamp bar to take up lost motion on the shank;
(d) means for raising and lowering said clamp bar to permit insertion of material to be cut, said means permitting at least the ends of said spaced arms to be raised; and
(e) a cutter head mounted on said clamp bar for lengthwise movement with respect thereto, to cut said material.

7. The machine of claim 6, wherein said spaced arms each comprise leaf spring means permitting the ends of said arms to be raised by resilient bending of said leaf springs.

8. The machine of claim 6, wherein said abutment provides a rounded profile for rolling engagement with said arm.

9. The machine of claim 8, wherein said fastener is rigidly secured to said clamp bar by means of a screw threaded element engaged on a threaded shank of the fastener, and said element engaging the opposite sides of a slideway formed in said clamp bar to slidingly receive said cutter head.

10. A cutting machine, comprising
(a) a base board to support a workpiece, such as a cupboard, cut;
(b) a clamp bar extending across the base board to clamp materials to be cut;
(c) a cutter head adjustably captively slidably mounted on the clamp bar for lost motion inhibiting lengthwise sliding movement with respect thereto to cut said materials;
(d) co-operating guide means on the clamp bar and the cutter head comprising a guideway on one of the clamp bar and cutter head, and a guide member on the other one of the clamp bar and cutter head, said guideway being a recessed V-shaped slot and said guide member being an outwardly tapering protrusion contoured to slidingly engage said slot, said protrusion having sliding contact on both sides of said V-shape; and
(e) additional interengaging sliding support surfaces stationarily disposed on said cutter head and said clamp bar, said additional surfaces being spaced from said guideway and guide member.

* * * * *

UNITED STATES PATENT AND TRADEMARK OFFICE
CERTIFICATE OF CORRECTION

PATENT NO. : 4,941,380

DATED : July 17, 1990

INVENTOR(S) : Robin C. Lockwood

It is certified that error appears in the above-identified patent and that said Letters Patent is hereby corrected as shown below:

Claim 1, line 3, change "cupboard" to --cardboard--.

Claim 5, delete the entire claim and replace it with:

--The machine of claim 1, wherein the sliding surfaces of said sides of said guideway and of said guide member are provided with a low friction material.--.

Claim 10, line 3, change "cupboard" to --cardboard--.

Signed and Sealed this

Tenth Day of December, 1991

*Attest:*

HARRY F. MANBECK, JR.

*Attesting Officer*        *Commissioner of Patents and Trademarks*